No. 846,411. PATENTED MAR. 5, 1907.
V. M. HARRIS.
APPARATUS FOR DUPLICATING PHONOGRAPH RECORDS.
APPLICATION FILED APR. 20, 1906.
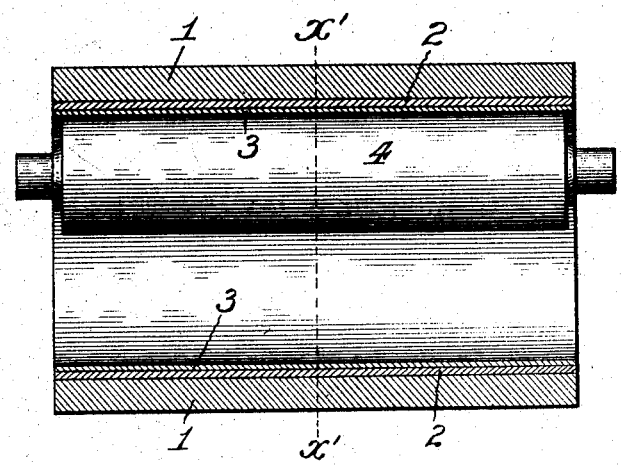
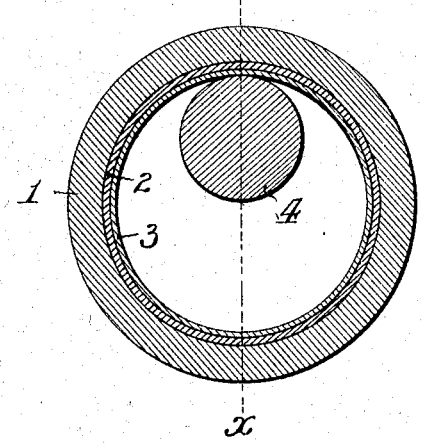

UNITED STATES PATENT OFFICE.

VARIAN M. HARRIS, OF CHICAGO, ILLINOIS, ASSIGNOR OF ONE-FIFTH TO ROBERT BURNS, OF CHICAGO, ILLINOIS.

APPARATUS FOR DUPLICATING PHONOGRAPH-RECORDS.

No. 846,411. Specification of Letters Patent. Patented March 5, 1907.

Original application filed April 11, 1904, Serial No. 202,515. Divided and this application filed April 20, 1906. Serial No. 312,763.

*To all whom it may concern:*

Be it known that I, VARIAN M. HARRIS, a citizen of the United States of America, and a resident of Chicago, in the county of Cook and State of Illinois, have invented certain new and useful Improvements in Apparatus for Duplicating Phonograph - Records, of which the following is a specification.

The present invention relates to the manufacture of duplicate phonograph-records of celluloid or other like material, in which a mold is used having a negative matrix formed in its interior surface or bore, and into which negative-matrix surface the duplicate phonograph-record in the form of a thin-walled cylinder is pressed to impart to the periphery of such cylinder a positive impression from such negative-matrix surface; and the object of the present improvement is to provide a simple and efficient apparatus for use in the described process and with which the production of the duplicate records can be effected in a rapid, certain, and positive manner, all as will hereinafter more fully appear and be more particularly pointed out in the claims.

In the accompanying drawings, illustrative of the present invention, Figure 1 is a longitudinal section of a primitive form of apparatus embodying the present invention, the section being taken on line x x, Fig. 2; Fig. 2, a transverse section of the same at line x' x', Fig. 1.

Similar numerals of reference indicate like parts in both views of the drawings.

Referring to the drawings, 1 represents the main mold body or backing of any usual suitable external form and of the required length and which is formed with a longitudinal central bore, as shown; 2 a negative matrix, of metal or other like hard substance, having a cylindrical form and fitted or fixedly secured within the bore of the main mold body or backing 1 as a lining. Such negative matrix will have its interior surface formed into a negative matrix in any usual manner, either by electrolytic or other methods now generally employed in the present art.

3 represents the thin cylindrical duplicate-record blank in place within the mold and in readiness to be formed into a completed record by the present apparatus.

4 is a pressure-roller of a cylindrical form having a uniform diameter along its entire length and which is arranged longitudinally within the bore of the mold and blank with its axis of rotation eccentric to the axis of the cylindric bore of the mold, &c., and with its periphery adapted to have forcible and rolling contact with the inner surface of the blank along the entire length thereof, so that in its movement of rotation upon its own axis and in its orbital movement around the axis of the other parts the said pressure-roller will embed the periphery of the duplicate-record blank 3 in the negative-matrix surface of the negative matrix 2, so that with a completion of the movement of said pressure-roller and the removal of such blank from the interior of the mold the periphery of such blank will have a positive impression of the negative matrix and be in a condition ready for use on a phonograph or like apparatus. Motion when required may be imparted to the said pressure-roller in a positive manner by any suitable carrying and driving mechanism which the judgment of the maker may suggest or the particular use of the present invention may indicate.

In the practical use of the present apparatus any usual and suitable means, either physical or chemical, may be employed to soften the duplicate phonograph-blank 3 during the process of imparting a positive impression upon the same from the negative-matrix surface 2 and with a view to expedite the operation of the apparatus or when required in the formation of a more perfect positive impression upon the periphery of such duplicate-record blanks.

The present apparatus is more especially adapted to the formation of duplicate records having very thin walls, which render them readily collapsible, in that by partly collapsing the same they can after forming be readily and quickly removed from the interior of the mold without any liability to a marring or defacement of the positive-record impressions upon their peripheries.

The process or method herein described constitutes the subject-matter of my application for Letters Patent, filed April 11, 1904, Serial No. 202,515.

Having thus fully described my said invention, what I claim as new, and desire to secure by Letters Patent, is—

1. In an apparatus for making duplicate phonograph-records the combination of a phonograph-mold having a longitudinal circular bore that is provided with a negative-matrix surface, and a pressure-roller of a cylindrical form having a uniform diameter along its entire length and arranged to move in an orbital path with relation to such matrix-surface and impart a positive impression to an interposed cylindrical phonograph-blank of flexible material, along the entire length of such blank and in a progressive manner, substantially as set forth.

2. In an apparatus for making duplicate phonograph-records the combination of a phonograph-mold having a longitudinal circular bore that is provided with a negative-matrix surface and a pressure-roller of a cylindrical form having a uniform diameter along its entire length and arranged longitudinally in said bore with its axis eccentric to the axis of such bore, and adapted to have a rotary movement around its axis and an orbital movement around the axis of said bore, so as to impart a positive impression to an interposed cylindrical phonograph-blank of flexible material, along the entire length of such blank and in a progressive manner, substantially as set forth.

Signed at Chicago, Illinois, this 14th day of April, 1906.

VARIAN M. HARRIS.

Witnesses:
　ROBERT BURNS,
　M. H. HOLMES.